United States Patent [19]

Phillips et al.

[11] Patent Number: 4,770,456
[45] Date of Patent: Sep. 13, 1988

[54] ROBOTIC END OF ARM TOOLING INTERNAL GRIPPER

[75] Inventors: Gregory A. Phillips, Albany, Ga.; Jeffrey L. Mummert, Anderson, Ind.

[73] Assignee: General Motors Corporation, Detroit, Mich.

[21] Appl. No.: 944,328

[22] Filed: Dec. 19, 1986

[51] Int. Cl.⁴ .............................. B66C 1/54; B25J 3/00
[52] U.S. Cl. ...................................... 294/93; 414/735
[58] Field of Search .................... 294/93, 119.3, 86.24, 294/63.2, 902, 903; 414/729, 730, 732, 731, 733, 734, 735, 738, 744, 618, 225, 120, 71, 6, 7, 5, 4, 3, 2, 1; 901/30, 36, 37

[56] References Cited

U.S. PATENT DOCUMENTS

| | | | |
|---|---|---|---|
| 2,708,994 | 5/1955 | Kraft | 192/88 |
| 2,741,381 | 4/1956 | Bezien | |
| 3,166,335 | 1/1965 | Mason | 279/2 |
| 3,253,854 | 5/1966 | Hollander, Jr. | 294/98.1 |
| 3,780,492 | 12/1973 | Corderoy | 53/247 |
| 3,945,486 | 3/1976 | Cooper | 294/93 |
| 4,078,671 | 3/1978 | Landstrum | 294/93 |
| 4,253,694 | 3/1981 | Walter et al. | 294/93 |
| 4,273,505 | 6/1981 | Clark et al. | 414/735 |
| 4,410,210 | 10/1983 | de Sivry | 294/99.1 |
| 4,629,237 | 12/1986 | Ito | 294/88 |

FOREIGN PATENT DOCUMENTS 562491 10/1977 U.S.S.R. ................................. 294/93

Primary Examiner—James B. Marbert
Attorney, Agent, or Firm—Ernest E. Helms

[57] ABSTRACT

The present invention provides an end of arm tooling (EOAT) internal gripper device for a robot. The EOAT of the present invention provides a gripper portion which can be elastically deformed by being extended or retracted by an internal rod actuator. Extension of the actuator rod causes the gripper portion to assume a smaller dimensional shape for insertion into a workpiece cavity. Retraction of the actuator rod causes the gripper portion to increase in dimension therefore engaging and gripping the workpiece. The EOAT of the present invention is extremely useful in applications requiring large amounts of compliance, delicate handling, and/or in environments wherein an air supply is not available or desirable.

6 Claims, 1 Drawing Sheet

ROBOTIC END OF ARM TOOLING INTERNAL GRIPPER

FIELD OF THE INVENTION

The field of the present invention is that of robot end of arm tooling devices (EOAT) commonly referred to as end effectors. More particularly the field of the present invention relates to EOATs for grabbing a workpiece by a cavity or an interior bore of the workpiece.

DISCLOSURE STATEMENT

It is well known to provide robots with EOAT internal grippers which allow the robot to manipulate the workpiece by grabbing the workpiece by an internal bore or cavity. There are two major types of EOAT internal grippers. One type of EOAT internal gripper provides an actuator connected by a linkage with a series of fingers which can be moved outward. One problem of the linkage type EOAT internal gripper is that it is often hard to provide a linkage giving the desired mechanical advantage, dimensional compliance and clearance for insertion into the workpiece cavity required for a given application. Often modifications in the size of the work piece cavity will require a redesign of the EOAT. Still another problem of finger type EOAT internal grippers is that they can often mar the surfaces of delicate workpieces. Another type of EOAT internal gripper is the inflatable bladder gripper. The inflatable bladder gripper has a bladder (with or without a surrounding shell) which may be inserted within the cavity of the part. A hydraulic or pneumatic system is provided for inflating the bladder causing the bladder (or surrounding shell) to engage with the workpiece cavity to grab the workpiece. Although the inflatable bladder gripper usually provides more dimensional compliance than the typical linkage EOAT internal gripper, often the dimensional compliance provided is still not sufficient for a given application. Also the inflatable bladder gripper often requires the use of very high air or hydraulic pressure to provide the proper compliance. Further, the use of air or hydraulic pressure in the bladder can provide sealing problems. Still another disadvantage of inflatable bladder grippers, especially pneumatic ones, is that failures can be sudden, causing unplanned downtime to change the bladder. With inflatable bladder grippers care must be taken to protect the bladder from burrs and/or sharp edges which can readily damage the bladder leading to failure of the bladder.

SUMMARY OF THE INVENTION

To overcome the above noted and other problems the present invention is brought forth. The present invention provides an EOAT internal gripper which allows the robot to grab an object by an internal cavity or bore of the object. The EOAT of the present invention has means for connecting the EOAT to the robot. An extendible rod having a generally flanged end is also provided. Connecting with the flanged end of the rod and the connecting means is a gripper portion. The gripper portion has a first dimension allowing it to be inserted into the workpiece cavity when the rod is extended. When the rod is retracted the gripper portion has a second dimension allowing the gripper portion to engage with the cavity of the workpiece and grab the workpiece.

The present invention is advantageous in that it does not require a sealed bladder or the use of air or hydraulic systems unless one so desires such a system to power the extension of the rod actuator. The present invention provides greater compliance and can be utilized with standard off-the-shelf cylinder actuators. Since the gripper portion is not a sealed control volume, the EOAT gripper of the present invention can suffer punctures or other cuts and still remain functional unlike the prior inflatable bladder gripper.

It is an object of the present invention to provide an apparatus and method of utilization of the same of a EOAT internal gripper.

It is another object of the present invention to provide a robot EOAT for grabbing a workpiece by a cavity in the workpiece including a plate for connecting the EOAT with the robot, a cylinder actuator adjacent the plate having a piston rod extendible with respect to the plate, a flange on the end of the rod opposite the robot, a spacer surrounding the actuator and attached with the plate, and an elastomeric cylindrical boot connecting with the spacer and the flange of the rod, the boot having a first dimension when the rod is extended whereby the boot is elastically deformed allowing the boot to be inserted into the workpiece cavity and the boot having a second dimension when the rod means is retracted whereby the boot engages with the workpiece cavity grabbing the workpiece.

It is still yet another object of the present invention to provide a method of grabbing a workpiece by a cavity of said workpiece using a robot including connecting an actuator with an extendible rod with the robot wherein the rod has a flanged end opposite the robot, connecting a gripper portion with the robot and the rod flanged end, extending the rod whereby the gripper portion has a first dimension allowing the gripper portion to be inserted into the workpiece cavity, and retracting the rod whereby the gripper portion has a second dimension engaging with the workpiece cavity to grab the workpiece.

Other objects, desires, and advantages of the present invention will become more apparent to those skilled in the art as the nature of the invention is better understood from the accompanying drawings and a detailed description.

DETAILED DESCRIPTION OF THE DRAWINGS

Figure 1:
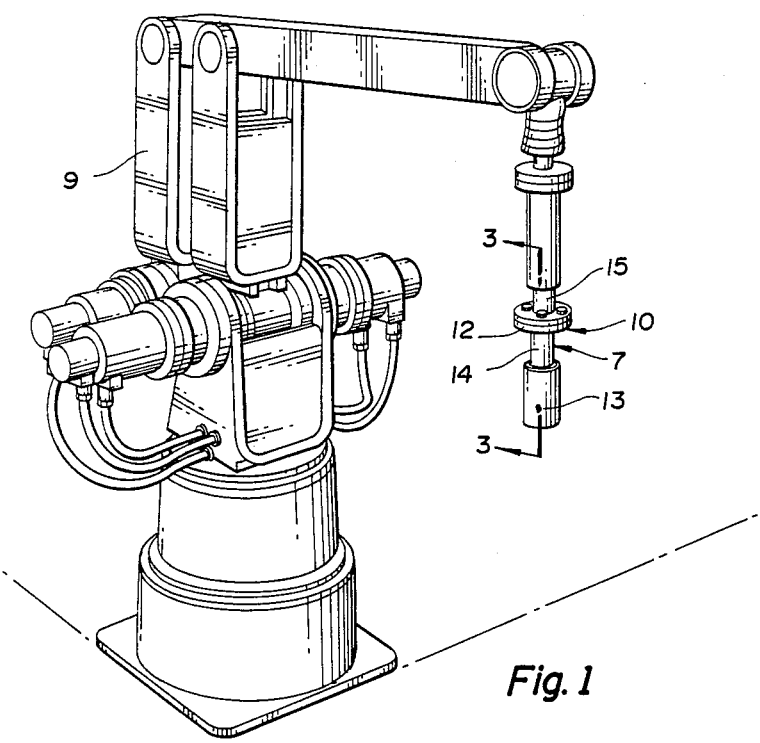
FIG. 1 is a perspective view of a robot with preferred embodiment EOAT of the present invention.
Figure 2:
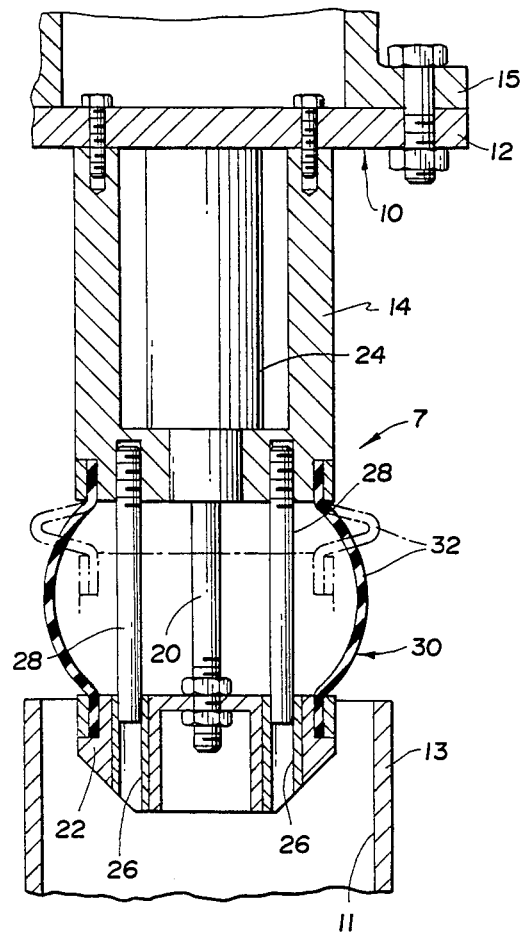
FIG. 2 is a sectional view with portions cut away similar to the view of FIG. 3 illustrating the EOAT of FIG. 1 prior to insertion into the cavity of a workpiece.
Figure 3:
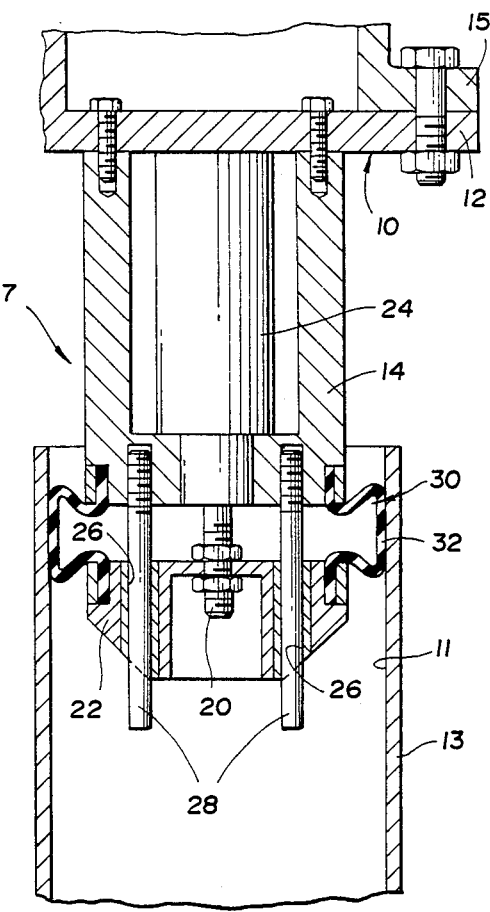
FIG. 3 is a view taken along line 3—3 of FIG. 1.

Referring to FIGS. 1, 2 and 3 the EOAT 7 of the present invention has three major elements. The first major element of the workpiece is the means for connecting EOAT to the robot 10. The next major element of the EOAT is the rod means 20 (hereinafter referred to as the rod). The rod 20 has a flanged end opposite the robot and the rod 20 is extendible with respect to the connecting means 10. The third major element of the present invention is the gripper portion 30 which connects the connecting means 10 with the flanged end of the rod 20. The gripper portion 30 has a first dimension when the rod 20 is extended allowing the gripper portion 30 to be inserted into a workpiece cavity 11. The gripper portion 30 has a second, usually larger dimension when the rod 20 is retracted, allowing the gripper portion 30 to engage with the workpiece cavity 11 to grab the workpiece 13.

The EOAT 7 has an attachment plate 12 for connection to the arm 15 of the robot 9. Fixably attached to the attachment plate 12 is a cylindrical spacer 14. Fixably connected to the attachment plate 12 within the cylindrical spacer is a fluid cylinder actuator 24.

The fluid cylinder actuator 24 has at its end opposite the robot 9 the extendible rod 20. The rod 20 has, at an end opposite robot 9, a flange 22. The flange 22 has two bores 26 generally parallel with the rod 20. Anti-rotational studs 28 attached with the spacer 14 project through the flange 22 to prevent the rod 20 from rotating. Anti-rotational studs 28 can be deleted when using a nonrotational actuator cylinder.

Connecting the spacer 14 with the flange 22 is the gripper portion 30 which in the embodiment of FIGS. 1, 2 and 3 is an elastomeric cylindrical boot 32. The boot 32 in its natural state assumes a cross-sectional shape of a turret (FIG. 2 in phantom). When elongated by the extension of the rod 20, the boot 32 assumes a cylindrical tubular configuration and first dimension of that shown (FIG. 2 solid line) allowing the boot 32 and EOAT 7 to be inserted into the cavity 11 of the workpiece 13. Upon retraction of the rod 20 by the cylinder actuator 24 the boot assumes a second dimension (FIG. 3) which engages with the workpiece cavity 11 allowing the piece 13 to be grabbed by the EOAT.

It is often common for cylinder actuators to have only one length of extension. To use EOAT on a workpiece with a larger (smaller) cavity than that of cavity 11, a spacer longer (shorter) than spacer 14 can be substituted. The above will cause the boot 32 to assume a greater (smaller) second dimension when the rod 20 is retracted. The above procedure is usually preferable over changing the actuator cylinder or boot for a different workpiece cavity dimension.

The cylinder actuator 24 utilized may be a fluid actuator or a mechanical or electrical actuator. The boot 32 of EOAT 7 is designed to have its larger second dimension at or near its free state. However the present invention can be utilized wherein the boot in the free state assumes a smaller dimension. However the later described option is typically not desirable since it is difficult to control the shape of the boot when attempting to place the boot into a larger dimension under compression from a generally smaller free state dimension.

The present invention provides a method of using a robot 9 to grab a workpiece 13 by the cavity 11 of the workpiece 13, the method including the following steps:

1. Connecting 10 an actuator 24 with an extendible rod 20 with the robot 9 wherein the rod 20 has a flanged end 22 opposite the robot 9;

2. Connecting an end of a gripper portion 22 with the robot and connecting the other end of the gripper portion 22 with the rod flanged end 22 axially fixed with respect to the rod;

3. Extending the rod 20 whereby the gripper portion 32 has a first dimension allowing the gripper portion to be inserted into the workpiece cavity 11;

4. Retracting the rod 20 whereby the gripper portion 32 has a second dimension engaging with the workpiece cavity 11 to grab the workpiece 13.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A robot EOAT for grabbing a workpiece by a cavity in said workpiece, said EOAT in combination comprising:
   means for connecting said EOAT with said robot;
   rob means having a generally flanged end opposite said robot, said rod means being extendible with respect to said connecting means; and
   a gripper portion having an end connecting with said connecting means and having another end connecting with said flanged end of said rod means and said other end being axially fixed with rspect to said rod means, said gripper poriton having a first dimension when said rod means is extended whereby said gripper portion can be inserted into said workpiece cavity and said gripper portion having a second dimension when said rod means is retracted whereby said gripper portion engages with said workpiece cavity to grab said workpiece.

2. An EOAT as described in claim 1 wherein said gripper portion is an elatomeric boot.

3. An EOAT as described in claim 2 wherein said boot is in the shape of a cylindrical tube.

4. A robot EOAT for grabbing a workpiece by a cavity in said workpiece, said EOAT in combination comprising:
   a plate for connecting said EOAT with said robot
   a cylinder actuator adjacent said plate having a piston rod extendible with respect to said plate, said piston rod having a flange on an end of said rod opposite said robot;
   a spacer surrounding said actuator and attached with said plate; and
   an elastomeric cylindrical boot having an end connecting with said spacer and having another end connecting with said flange of said rod and said other end being axially fixed with respect to said rod, said boot having a first dimension when said rod is extended whereby said boot is elastically deformed allowing said boot to be inserted into said workpiece cavity and said boot having a second dimension when said rod means is retracted whereby said boot engages with said workpiece cavity grabbing said workpiece.

5. An elastomeric EOAT as described in claim 4 wherein said boot in its natural state has a cross-sectional shape of a turret.

6. A method of grabbing a workpiece by a cavity of said workpiece using a robot, said method in combination comprising:
   connecting an actuator with an extendible rod with said robot wherein said rod has a flanged end opposite said robot;
   connecting a gripper portion with said robot and said rod flanged end;
   extending said rod whereby said gripper portion has a first dimension allowing said gripper portion to be inserted into said workpiece cavity; and
   retracting said rod whereby said gripper portion has a second dimension engaging with said workpiece cavity to grab said workpiece.

* * * * *